United States Patent
Saito et al.

(10) Patent No.: US 9,612,727 B2
(45) Date of Patent: Apr. 4, 2017

(54) TASK CHANGING APPARATUS, TASK CHANGING METHOD, AND TASK CHANGING PROGRAM

(71) Applicants: Fuminori Saito, Nagoya (JP); Kunimatsu Hashimoto, Nagakute (JP)

(72) Inventors: Fuminori Saito, Nagoya (JP); Kunimatsu Hashimoto, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 329 days.

(21) Appl. No.: 14/185,483

(22) Filed: Feb. 20, 2014

(65) Prior Publication Data

US 2014/0298231 A1 Oct. 2, 2014

(30) Foreign Application Priority Data

Apr. 2, 2013 (JP) .................................. 2013-076765
Jun. 19, 2013 (JP) .................................. 2013-128263

(51) Int. Cl.
| | |
|---|---|
| *G06F 3/048* | (2013.01) |
| *G06F 3/0484* | (2013.01) |
| *B25J 9/16* | (2006.01) |

(52) U.S. Cl.
CPC .......... *G06F 3/0484* (2013.01); *B25J 9/1661* (2013.01); *G05B 2219/40095* (2013.01); *G05B 2219/40099* (2013.01)

(58) Field of Classification Search
CPC ............... G06F 3/04847; G06F 3/0482; H04L 29/064421; H04L 41/22
See application file for complete search history.

(56) References Cited

U.S. PATENT DOCUMENTS

| 6,167,328 | A | 12/2000 | Takaoka et al. |
| 6,381,515 | B1 | 4/2002 | Inoue et al. |
| 7,643,907 | B2 * | 1/2010 | Fuhlbrigge ............ B25J 9/1656 700/245 |
| 2003/0120391 | A1 | 6/2003 | Saito |
| 2006/0111811 | A1 * | 5/2006 | Okamoto ................. B25J 5/007 700/214 |

(Continued)

FOREIGN PATENT DOCUMENTS

| JP | H1031581 A | 2/1998 |
| JP | 2000-210886 A | 8/2000 |

(Continued)

*Primary Examiner* — Anil N Kumar
(74) *Attorney, Agent, or Firm* — Dinsmore & Shohl LLP

(57) ABSTRACT

A task changing apparatus changes a task program executed by a robot. The task changing apparatus includes: a storage unit that stores a task program including a plurality of hierarchical levels arranged in a tree-like structure representing a plurality of pieces of task information executed by the robot and lower-order task information associated with the task information; a display control unit that causes the task information to be displayed on a display screen of a display unit so as to allow setting of the task information, the task information being associated with each other for each hierarchical level of the task program stored in the storage unit; and a change unit that changes the task program for the robot based on a series of pieces of task information set on the display screen of the display unit.

9 Claims, 17 Drawing Sheets

(56) References Cited

U.S. PATENT DOCUMENTS

| | | | |
|---|---|---|---|
| 2008/0009973 A1* | 1/2008 | Matsuo | B25J 9/1671 700/246 |
| 2008/0046834 A1* | 2/2008 | Yu | G06Q 10/10 715/771 |
| 2011/0071676 A1* | 3/2011 | Sanders | B25J 9/1661 700/250 |
| 2013/0145299 A1* | 6/2013 | Steimle | G06F 3/048 715/771 |

FOREIGN PATENT DOCUMENTS

| | | |
|---|---|---|
| JP | 2001-154723 A | 6/2001 |
| JP | 2003-256025 A | 9/2003 |
| JP | 2007-242054 A | 9/2007 |
| JP | 2008-142788 A | 6/2008 |
| JP | 2010-182235 A | 8/2010 |
| JP | 2011-200970 A | 10/2011 |

* cited by examiner

TASK CHANGING APPARATUS, TASK CHANGING METHOD, AND TASK CHANGING PROGRAM

INCORPORATION BY REFERENCE

This application is based upon and claims the benefit of priority from Japanese patent application No. 2013-076765, filed on Apr. 2, 2013, and Japanese patent application No. 2013-128263, filed on Jun. 19, 2013, the disclosure of which is incorporated herein in its entirety by reference.

BACKGROUND OF THE INVENTION

1. Field of the Invention

The present invention relates to a task changing apparatus, a task changing method, and a task changing program for changing contents of tasks to be executed by a robot.

2. Description of Related Art

In the process of robot task teaching, for example, a predetermined unit manipulation (operation program) prepared in advance is displayed as an icon on a teaching panel. Further, a technique is known in which a user selects the icon and determines the manipulation to register the manipulation program in the robot, thereby enabling the robot to operate according to the manipulation program (for example, see Japanese Unexamined Patent Application Publication No. 2010-182235).

Incidentally, the environments under which robots for life support, for example, are used are not constant, but can change frequently. Accordingly, even when a preset task is executed, the operation cannot be continued in some cases, for example, due to interference with an obstacle in the process of the operation. This can be avoided by instructing a teaching panel or the like to change the operation of the robot. However, even when several predetermined task programs and the like are prepared in advance, the programs have no correlation therebetween, so the teaching of avoidance operation for the robot is not necessarily established. Even if the teaching is established, the settings therefor can be difficult. This can also be avoided by the recognition of surroundings by the robot itself using camera images or the like, but the conditions therefor are limited.

SUMMARY OF THE INVENTION

The present invention has been made to solve the above-mentioned problems, and has a main object to provide a task changing apparatus, a task changing method, and a task changing program, which are capable of easily changing contents of tasks to be executed by a robot.

A first exemplary aspect of the present invention to achieve the above-mentioned object is a task changing apparatus that changes a task program executed by a robot, including: a storage unit that stores a task program including a plurality of hierarchical levels arranged in a tree-like structure representing a plurality of pieces of task information executed by the robot and lower-order task information associated with the task information; a display control unit that causes the task information to be displayed on a display screen of a display unit so as to allow setting of the task information, the task information being associated with each other for each hierarchical level of the task program stored in the storage unit; and a change unit that changes the task program for the robot based on a series of pieces of task information set on the display screen of the display unit.

In the first exemplary aspect, the task program stored in the storage unit may configure the task information in a plurality of hierarchical levels, the task information including a plurality of task methods associated with each other in each hierarchical level indicating a task content of the robot.

In the first exemplary aspect, the display control unit may cause the task information and the task method included in the task information to be displayed side by side on the display screen of the display unit so as to allow selection of the task information and the task method.

In the first exemplary aspect, the display unit may display, on the display screen, the task information and upper and lower transition buttons that cause a display to transit upward and downward, respectively; and when the upper transition button is selected, the display control unit may cause task information of a higher hierarchical level in the task program than the task information displayed on the display screen of the display unit, to be displayed on the display screen of the display unit, and when the lower transition button is selected, the display control unit may cause task information of a lower hierarchical level in the task program than the task information displayed on the display screen of the display unit, to be displayed on the display screen of the display unit.

In the first exemplary aspect, when a predetermined manipulation is performed on a task method displayed on the display screen of the display unit, the display control unit may cause a change menu to be displayed on the display screen of the display unit, the change menu being set to change a variable for the task information.

In the first exemplary aspect, the display control unit may cause a storage menu to be displayed on the display screen of the display unit, the storage menu being set to select whether or not the task method and/or the variable changed on the display screen of the display unit is stored into the storage unit.

In the first exemplary aspect, when a predetermined manipulation is performed on the task information displayed on the display screen of the display unit, the display control unit may cause an edit menu to be displayed on the display screen of the display menu, the edit menu being set to edit an icon associated with the task information.

In the first exemplary aspect, the edit menu may include at least one of duplication, sorting, renaming, and deletion of the icon associated with the task information.

In the first exemplary aspect, upon determining that the robot is in an unworkable state, the display control unit may cause message information for notifying the unworkable state to be displayed on the display screen of the display unit, and may cause the task information to be displayed on the display screen of the display unit so as to allow setting of the task information, the task information being associated with each other for each hierarchical level of the task problem.

A second exemplary aspect of the present invention to achieve the above-mentioned object is a task changing method for changing a task program executed by a robot, the task changing method including the steps of: storing a task program including a plurality of hierarchical levels arranged in a tree-like structure representing a plurality of pieces of task information executed by the robot and lower-order task information associated with the task information; causing the task information to be displayed on a display screen so as to allow setting of the task information, the task information being associated with each other for each hierarchical level of the task program; and changing the task program for the robot based on a series of pieces of task information set on the display screen.

A third exemplary aspect of the present invention to achieve the above-mentioned object is a task changing program for causing a computer to execute processing including: causing task information to be displayed on a display screen so as to allow setting of the task information, the task information being associated with each other for each hierarchical level of a task program, the task program including a plurality of hierarchical levels arranged in a tree-like structure representing a plurality of pieces of task information executed by a robot and lower-order task information associated with the task information; and changing the task program for the robot based on a series of pieces of task information set on the display screen.

According to the present invention, it is possible to provide a task changing apparatus, a task changing method, and a task changing program, which are capable of easily changing contents of tasks to be executed by a robot.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
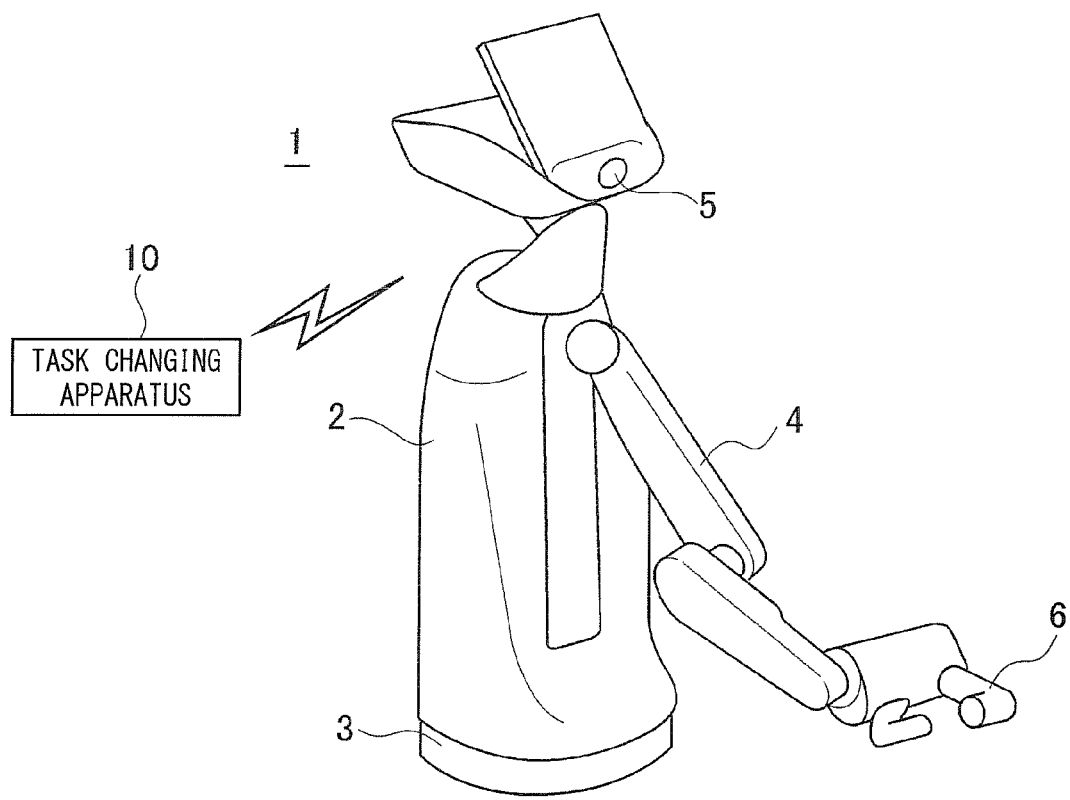
FIG. 1 is a view showing an example of a working robot according to an exemplary embodiment of the present invention.

Exemplary embodiments of the present invention will be described below with reference to the drawings. A task changing apparatus according to an exemplary embodiment of the present invention is an apparatus that changes contents of tasks to be executed by a working robot 1 as shown in FIG. 1, for example.

The working robot 1 is an autonomous robot that is configured to move to any location so as to be able to execute any task for a person, such as picking up an object, going and getting an object, cleaning up the floor, or opening the window. The working robot 1 includes a robot body 2, a moving carriage 3, an articulated arm 4, and a camera 5. The moving carriage 3 drives wheels and the like, which are provided to the robot body 2, to thereby allow the robot body 2 to move. The articulated arm 4 is coupled to the robot body 2. The camera 5 captures images of ambient environments. A gripper (grip unit) 6 capable of gripping an object or the like is provided at a distal end of the articulated arm 4. The working robot 1 can move to a desired set location while avoiding an obstacle or the like, based on the images of the ambient environments which are captured by the camera 5. The working robot 1 can also perform tasks, such as gripping and moving an object, by driving each of the arm 4 and the gripper 6. The configuration of the working robot 1 described above is illustrated by way of example and is not limited to this. The configuration of the working robot 1 is applicable to any autonomous robot.

A task changing apparatus 10 is configured separately from the working robot 1 and is connected to the working robot 1 wirelessly or with a wire. For example, the task changing apparatus 10 may be integrally or detachably mounted on the working robot 1. The task changing apparatus 10 transmits, to the working robot 1, a task program for allowing the working robot 1 to execute tasks. The working robot 1 executes tasks according to the task program transmitted from the task changing apparatus 10.

Figure 2:
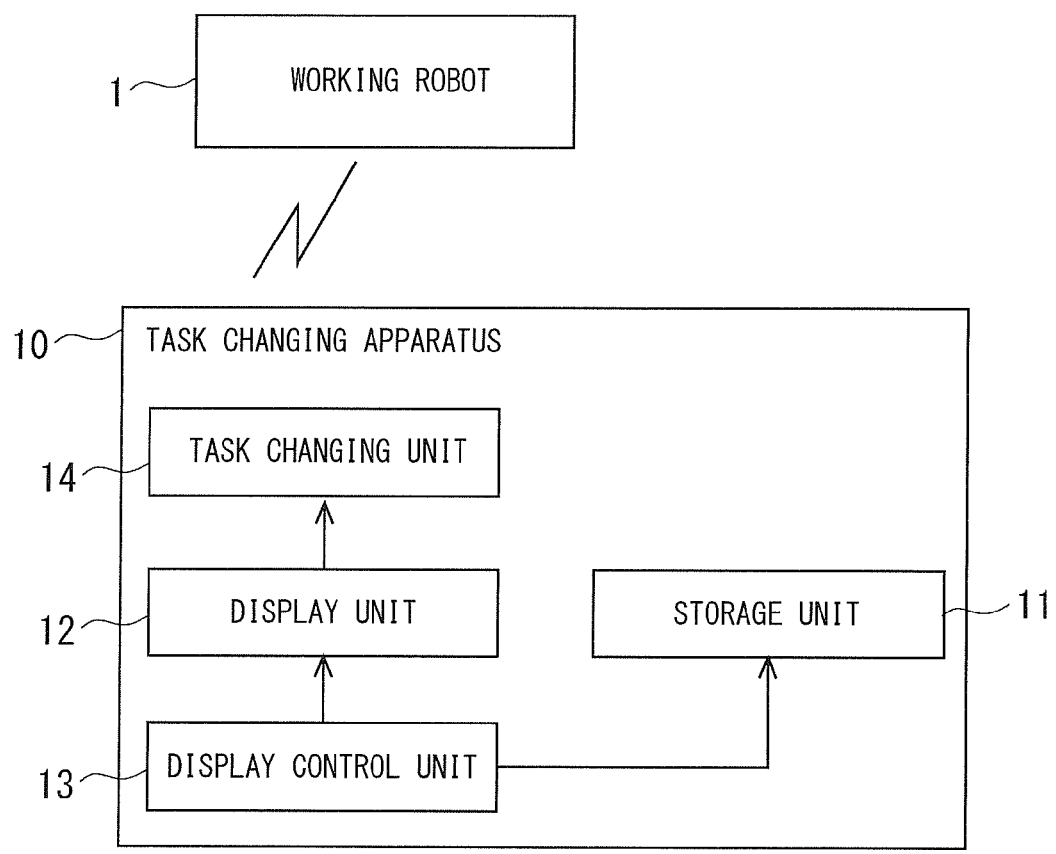
FIG. 2 is a block diagram showing a schematic system configuration of a task changing apparatus according to an exemplary embodiment of the present invention.

FIG. 2 is a block diagram showing a schematic system configuration of the task changing apparatus according to this exemplary embodiment. The task changing apparatus 10 according to this exemplary embodiment includes a storage unit 11, a display unit 12, a display control unit 13, and a task changing unit 14. The storage unit 11 stores various data, programs, and the like. The display unit 12 displays a menu or the like selected by a user. The display control unit 13 controls the display of the display unit 12. The task changing unit 14 changes the contents of tasks of the working robot 1 based on information set on the display screen of the display unit 12.

The task changing apparatus 10 has a hardware configuration centered on a microcomputer including a CPU (Central Processing Unit), which performs arithmetic processing, control processing, and the like; a memory including a ROM (Read Only Memory) or a RAM (Random Access Memory) which stores an arithmetic program, a control program, and the like to be executed by the CPU; and an interface unit (I/F) for inputting and outputting signals to and from the outside. The CPU, the memory, and the interface unit are interconnected through a data bus or the like.

The storage unit 11 is a specific example of a storage means, and is composed of, for example, the memory described above. The storage unit 11 stores a task program including a plurality of tasks (task information) to be executed by the working robot 1 and lower-order tasks related to the tasks. The plurality of tasks and lower-order tasks are arranged in a tree-like structure having a plurality of hierarchical levels.

Figure 3:
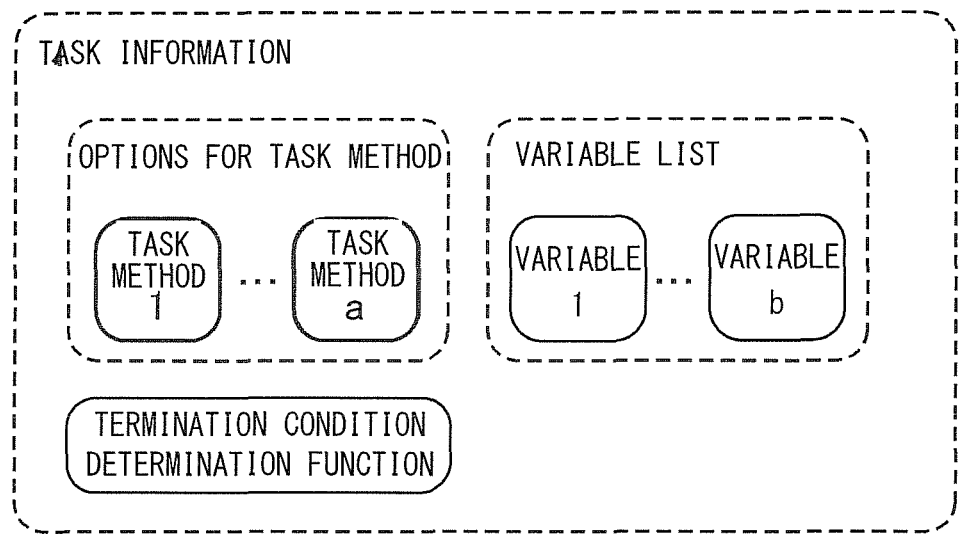
FIG. 3 is a diagram showing a configuration of a task.

The term "task" herein described refers to a physical or logical processing unit to be executed by the working robot 1, for example. A task includes at least an option for one or more task methods (method 1, method a) and a determination function (termination condition determination function) for determining whether or not the task is normally terminated (FIG. 3). The task may also include variables (variable 1, variable b) which commonly affect the behavior of the task, regardless of each task method.

Figure 4:
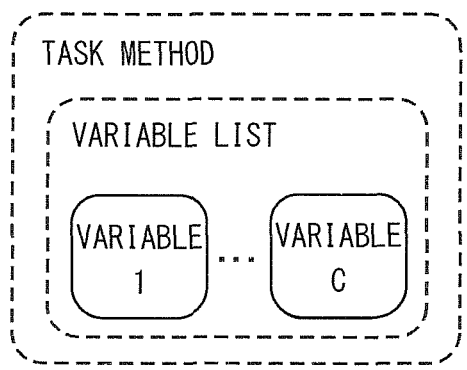
FIG. 4 is a diagram showing a relationship between a task method and task variables.

The task method is a process for guiding the task to the termination condition, and is generally associated with the variables that affect the process (FIG. 4).

Figure 5:
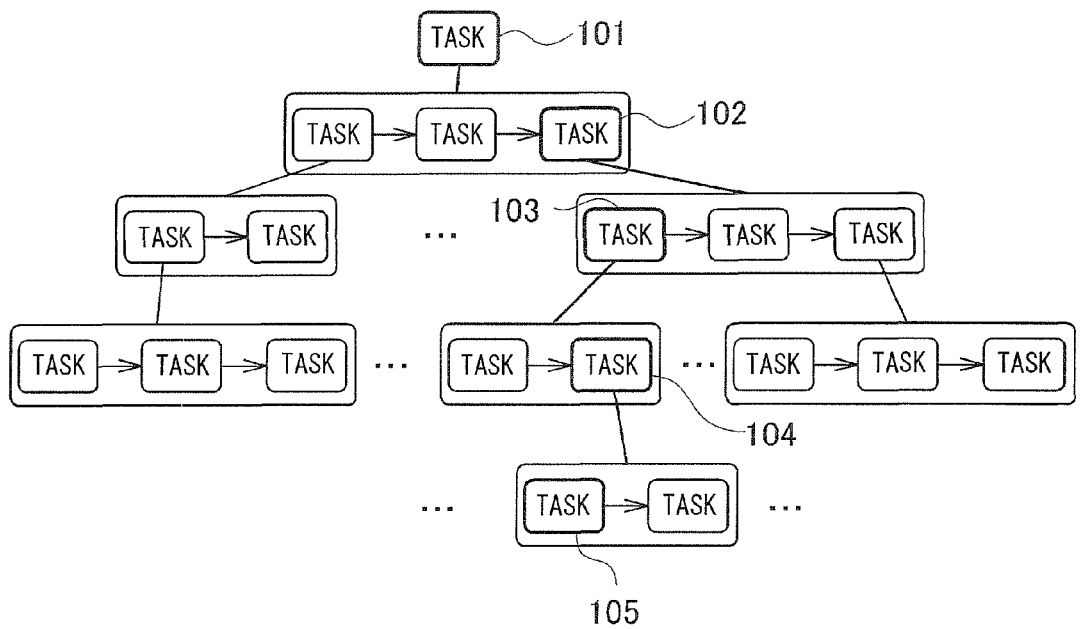
FIG. 5 is a diagram showing a schematic configuration of a task program.

The task program is a representation of a task that is deployed into specific task steps. The task program is a program in which each task is broken down into sequences of lower-order detailed tasks (FIG. 5). The task program can be hierarchically expressed in a tree structure by recursively deploying and defining a higher-order task into a plurality of lower-order tasks. The deployment into specific task steps varies depending on the selected task method, and is not uniquely determined only by selecting a task.

Figure 6:
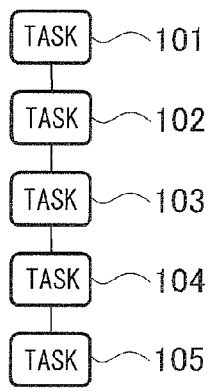
FIG. 6 is a diagram showing an example of a task branch.
Figure 7A:
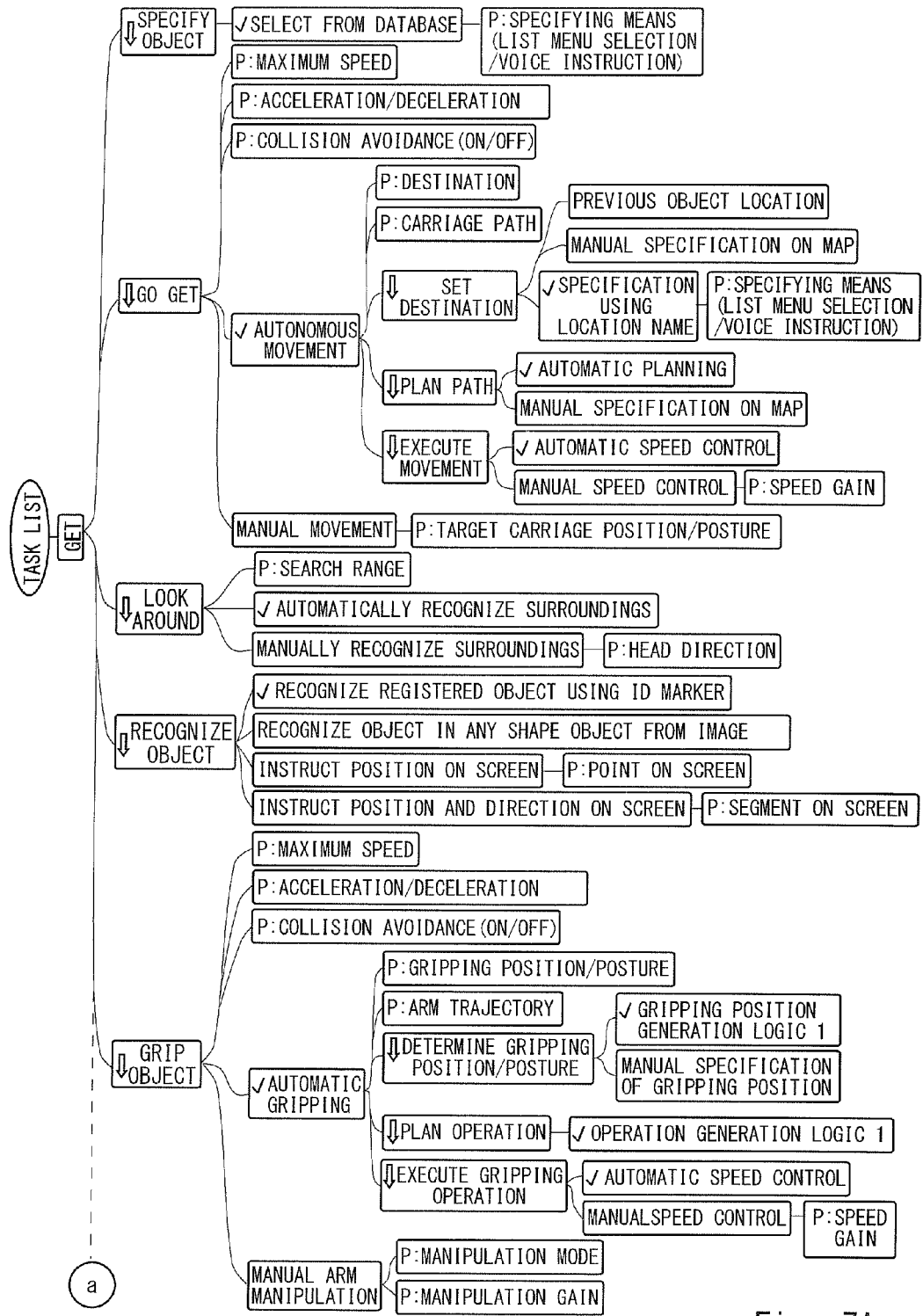
FIG. 7A is a diagram showing a specific example of a task program related to a task "get"
Figure 7B:
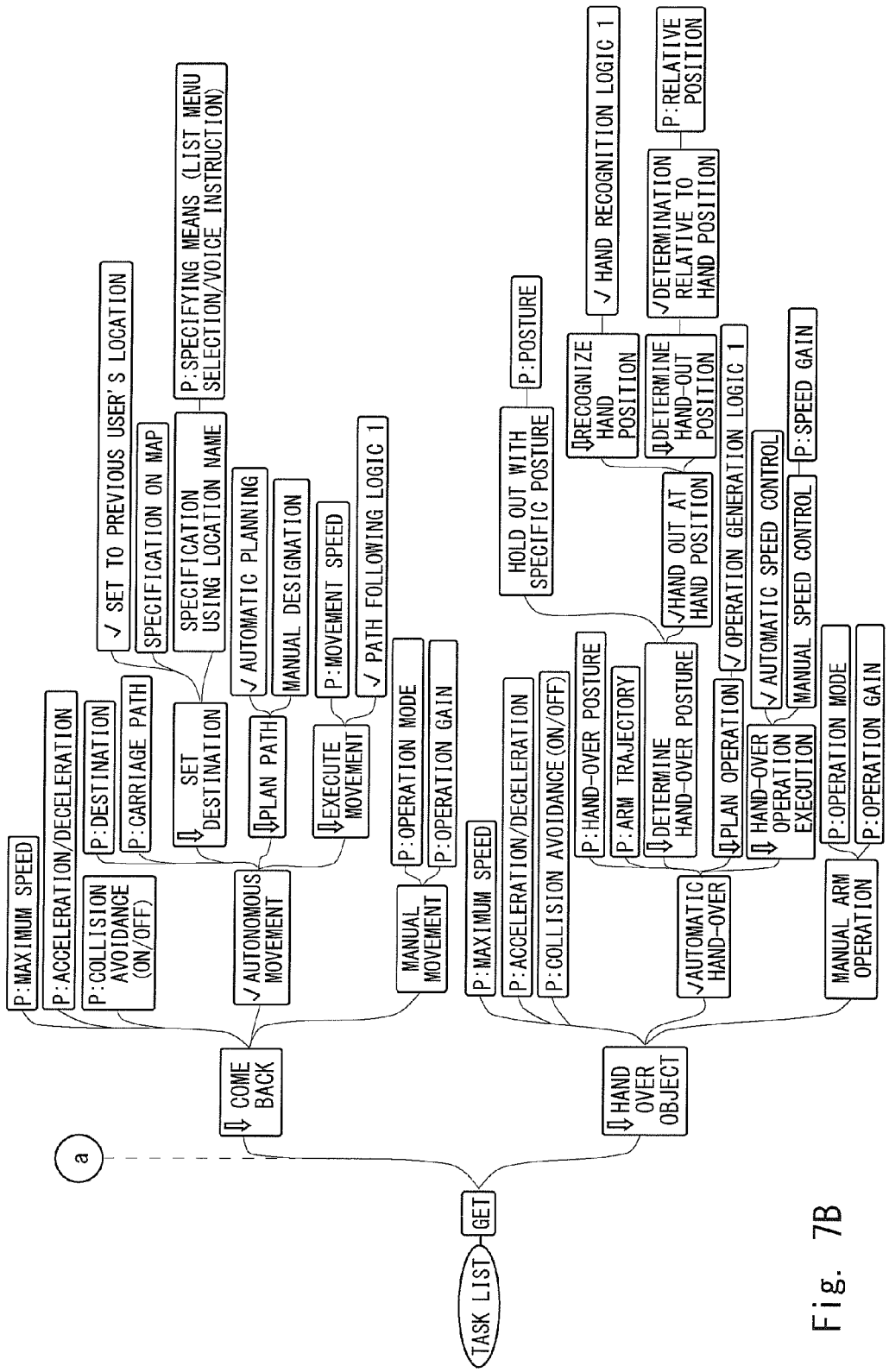
FIG. 7B is a diagram showing a specific example of the task program related to the task "get"

In hierarchical data shown in FIG. 5, for example, when a most significant task 101 is deployed into a specific task 105 through lower-order tasks 102, 103, and 104, the task content can be expressed as a task branch (a linkage of tasks, a sequence of tasks) as shown in FIG. 6. FIGS. 7A and 7B are diagrams each showing an example of a task program related to a task "get". Note that in FIGS. 7A and 7B, "↓," represents a task step (task); "P" represents a variable; and "t" represents a task method currently selected.

Figure 8:
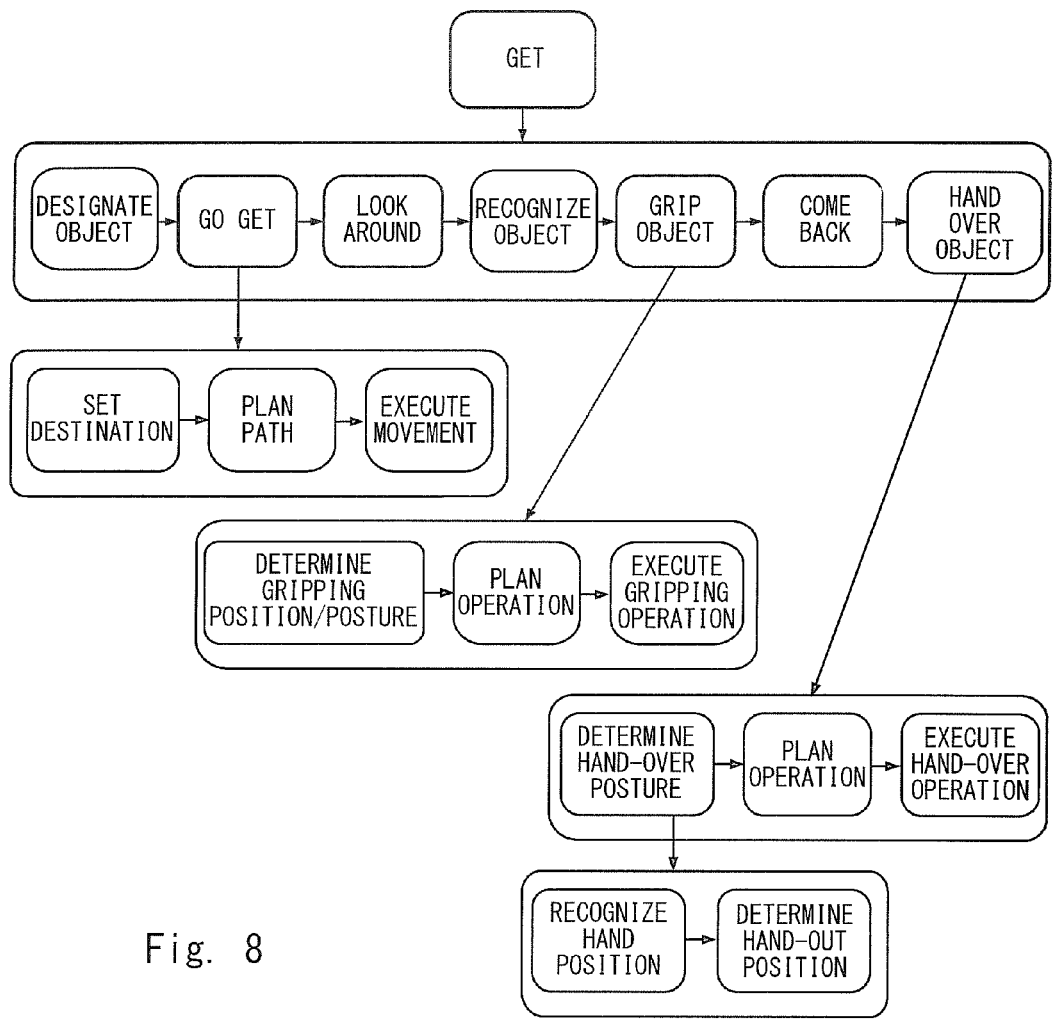
FIG. 8 is a diagram showing relationships between a higher hierarchical level and a lower hierarchical level.

Referring to FIGS. 7A and 7B, for example, in a lower hierarchical level of the task "get", tasks "specify an object", "go get", "look around", "recognize an object", "grip an object", "come back", and "hand over an object" are deployed (FIG. 8). In a lower hierarchical level of the task "go get" of this hierarchical level, tasks "set destination", "plan a path", "execute movement" are deployed. In a lower hierarchical level of the task "grip an object", tasks "determine a gripping position/posture", "plan an operation", and "execute a gripping operation" are deployed. Further, in a lower hierarchical level of the task "hand over an object", tasks "determine a hand-over posture", "plan an operation", and "execute a hand-over operation" are deployed. In a lower hierarchical level of the task "determine hand-over posture" of this hierarchical level, tasks "recognize a hand position" and "determine a hand-out position " are deployed. In this manner, each task is gradually embodied with the deployment into lower hierarchical levels.

Figure 9:
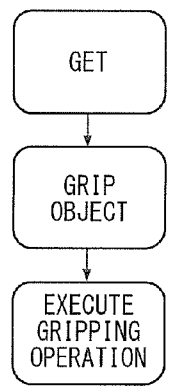
FIG. 9 is a diagram showing an example of a task branch shown in FIG. 8.

Referring to FIG. 8, for example, a task branch from the task "get" to the task "execute a gripping operation" represents the tasks "get", "grip an object", and "execute a gripping operation" as shown in FIG. 9.

The display unit 12 displays the task information, which is selected by the user, on the display screen. The display unit 12 includes a liquid crystal display device, an organic EL display device, or the like. The display unit 12 is a touch panel type display, for example, and is configured such that when the user touches (performs a tap operation, a flick operation, or the like) the selected information (icon or the like) displayed on the display screen, the corresponding selected information is input. The display unit 12 is provided with a joystick and a key, and is configured to be able to select and input selective information, such as a menu on the display screen, by manipulating the joystick and the key. The selective information on the display screen of the display unit 12 may be selected and input by connecting any input device such as a mouse.

The display control unit 13 is a specific example of a display control means. The display control unit 13 controls display contents on the display screen of the display unit 12, based on the selective information input on the display screen of the display unit 12 and the task program stored in the storage unit 11.

The task changing unit 14 is a specific example of a change means. The task changing unit 14 changes the task program for the working robot 1 based on a series of pieces of task information set on the display screen of the display unit 12, and stores the task program in the storage unit. Further, the task changing unit 14 transmits the changed task program to the working robot 1, for example. The working robot 1 executes tasks according to the task program transmitted from the task changing unit 14.

Incidentally, the environments under which robots for life support, for example, are used are not constant, but can change frequently. Accordingly, even when a preset task is executed, the operation cannot be continued in some cases due to interference with an obstacle in the process of the operation. In this case, there is a need to change the current task program for the working robot.

The task changing apparatus 10 of this exemplary embodiment can easily change the task program by allowing the user to set each task according to a display screen 200 of the display unit 12 as described later. Next, a specific example of a method for changing the task program by the task changing apparatus 10 according to this exemplary embodiment will be described.

Figure 10:
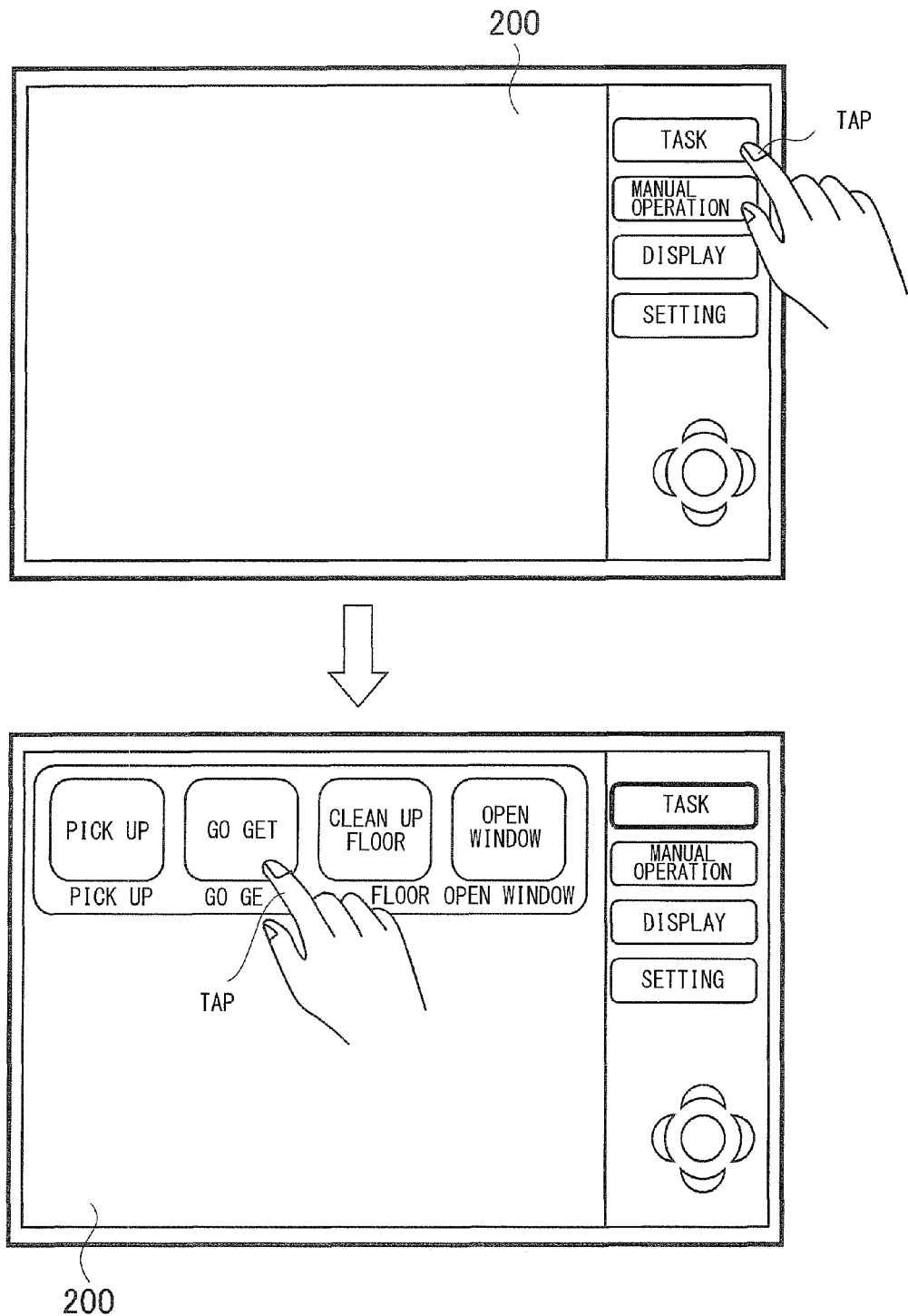
FIG. 10 is a diagram showing an example of a display screen displayed on a display unit at the start of a task.

FIG. 10 is a diagram showing an example of the display screen displayed on the display unit at the start of a task. For example, when the user selects "task" on the display screen 200 and inputs the task by a tap operation on the touch panel of the display unit 12, the display control unit 13 causes a task list (tasks "pick up", "get", "clean up the floor", and "open the window") to be displayed on the display screen 200 of the display unit 12. When the user selects, by a tap operation, one task (for example, "get") from among the tasks in the task list, the working robot 1 starts the task.

Figure 11:
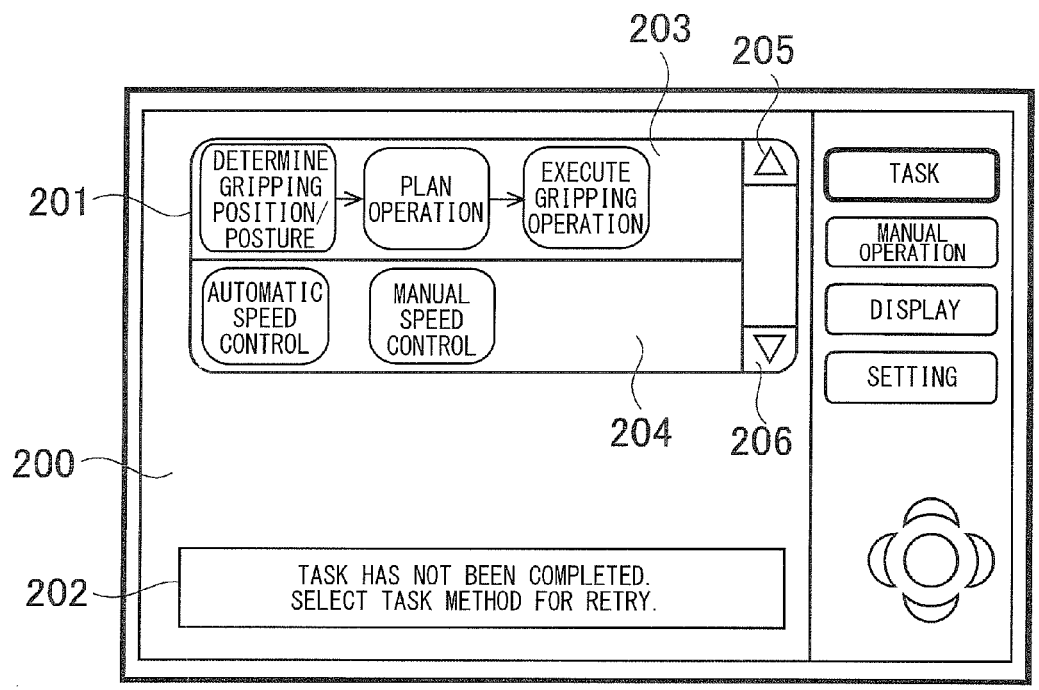
FIG. 11 is a diagram showing a configuration of a display on the display screen of the display unit.

FIG. 11 is a diagram showing an example of the display screen in the case where the task executed by the working robot 1 cannot be continued for some reason and is temporarily stopped. FIG. 11 illustrates an example in which the task "execute a gripping operation" that is executed in the task "get" cannot be completed. The display control unit 13 causes each task to be displayed on the display screen 200 of the display unit 12 for each hierarchical level of the task program, which is stored in the storage unit 11, so as to allow selection of each task. When the working robot 1 becomes unable to continue the task, for example, the display control unit 13 causes a task condition dialog 201, which includes the task being executed, to be displayed at an upper portion of the display screen 200, and causes message information 202 to be displayed below the task condition dialog 201 as shown in FIG. 11. The display control unit 13 causes the task steps ("determine a gripping position/posture", "plan an operation", and "execute a gripping operation") of the same hierarchical level, which lead to the task being executed, to be displayed in an upper display area 203 of the task condition dialog 201, for example, and causes the task method ("automatic speed control", "manual speed control", etc.), which is associated with the task being executed, to be displayed in a lower display area 204.

Figure 12:
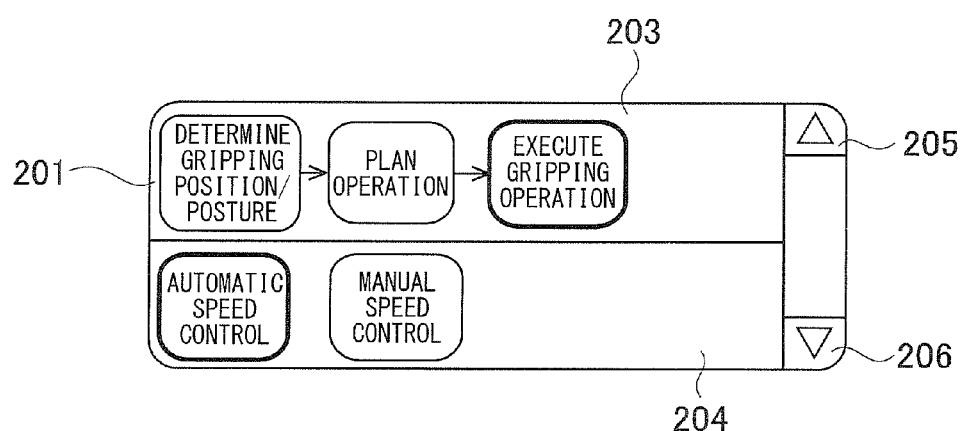
FIG. 12 is a diagram for explaining a task condition dialog on the display screen of the display unit.
Figure 16:
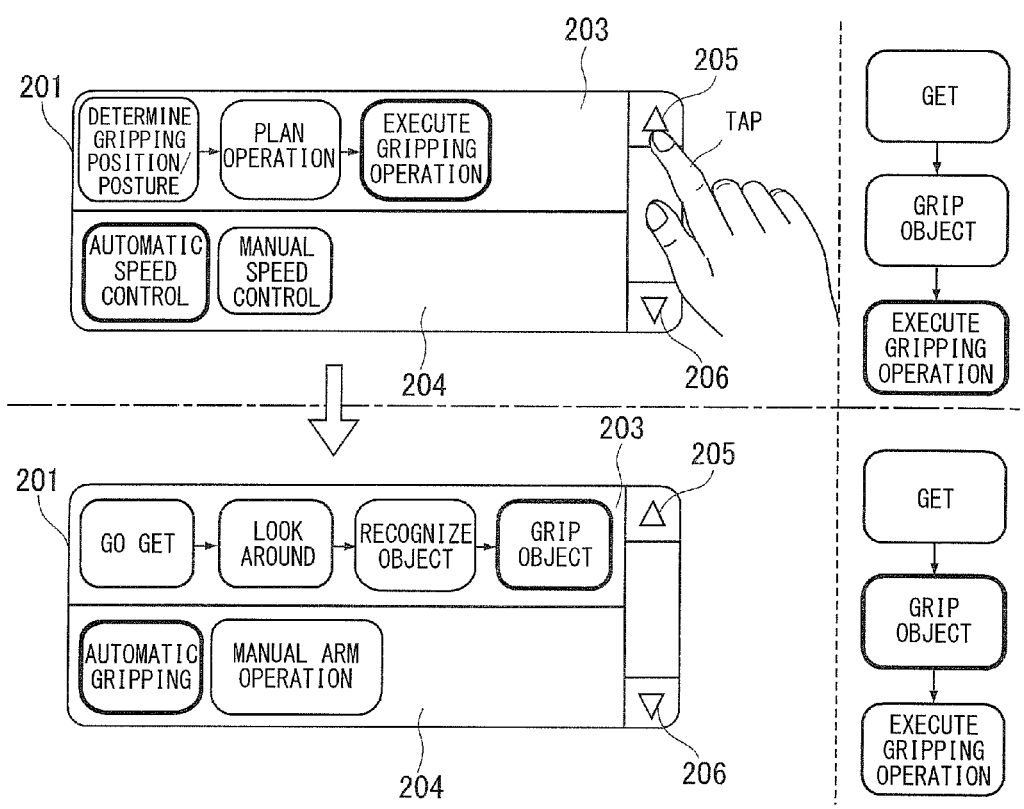
FIG. 16 is a diagram for explaining the task changing method during the task continuation disabled time.
Figure 17:
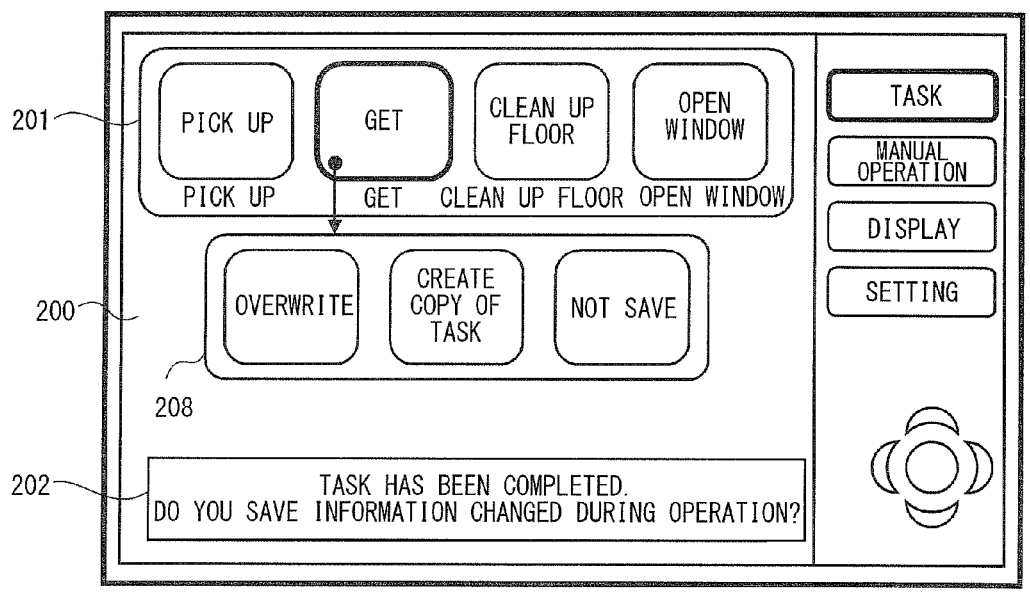
FIG. 17 is a diagram showing a display screen for storing a changed manipulation during the task continuation disabled time.

When the user selects (by tap operation, for example) an upper transition button 205 in the task condition dialog 201 on the display screen 200 of the display unit 12, the display control unit 13 changes the currently displayed task to the task of a higher hierarchical level along the task branch (FIG. 9) and causes the tasks to be displayed in the upper display area 203 and the lower display area 204 of the display screen 200 (FIG. 16). On the other hand, when the user selects a lower transition button 206 in the task condition dialog 201 on the display screen 200 of the display unit 12, the display control unit 13 changes the currently displayed task to the task of a lower hierarchical level along the task branch (FIG. 9) and causes the tasks to be displayed in the upper display area 203 and the lower display area 204 of the display screen 200. The display control unit 13 highlights, by enhancement-line display, bright display, or blinking display, the task and task method (for example, "execute a gripping operation", "automatic speed control"), which are currently selected (executed), on the display screen 200 (FIG. 12).

The display control unit 13 causes the message information 202 related to the selected task to be displayed below the upper display area 203 and the lower display area 204 on the display screen 200 of the display unit 12. For example, when the task "execute a gripping operation" is selected on the display screen 200 of the display unit 200 and the gripping task has not been completed as a result of the execution of the gripping operation (during a task continuation disabled time), the display control unit 13 causes the message information 202 indicating that "The task has not been completed. Select a task method for retry." to be displayed.

Figure 13:
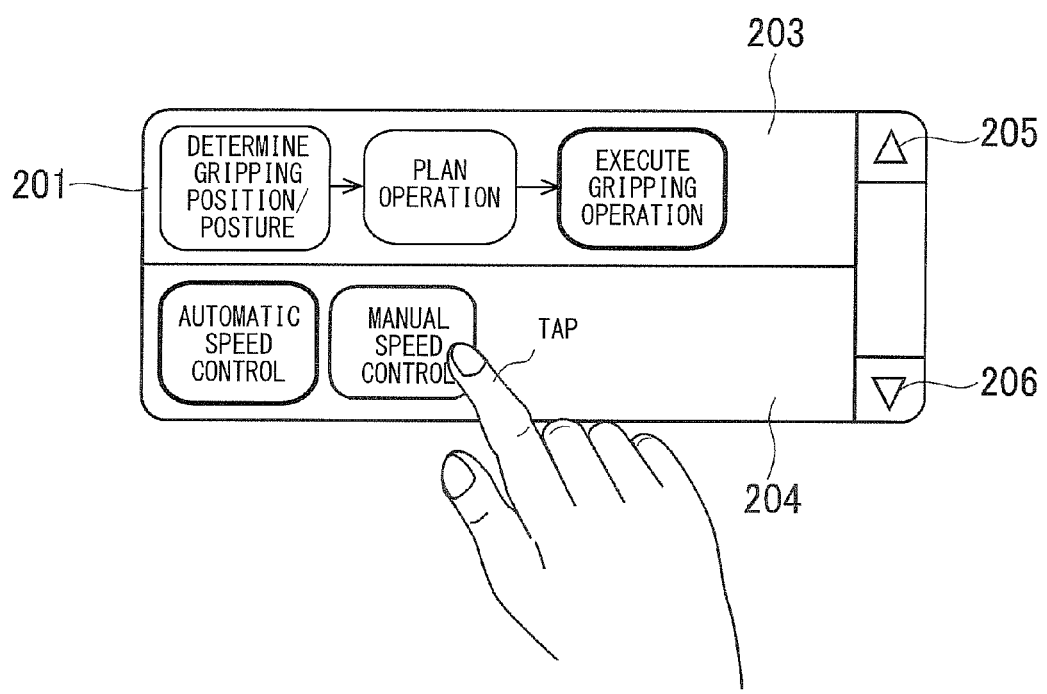
FIG. 13 is a diagram for explaining a task changing method during a task continuation disabled time.

During such a task continuation disabled time, the user can change (by tap operation) the task method "automatic speed control", which is displayed in the lower display area 204 of the display screen 200 of the display unit 12, to "manual speed control" and resume the task (FIG. 13).

Figure 14:
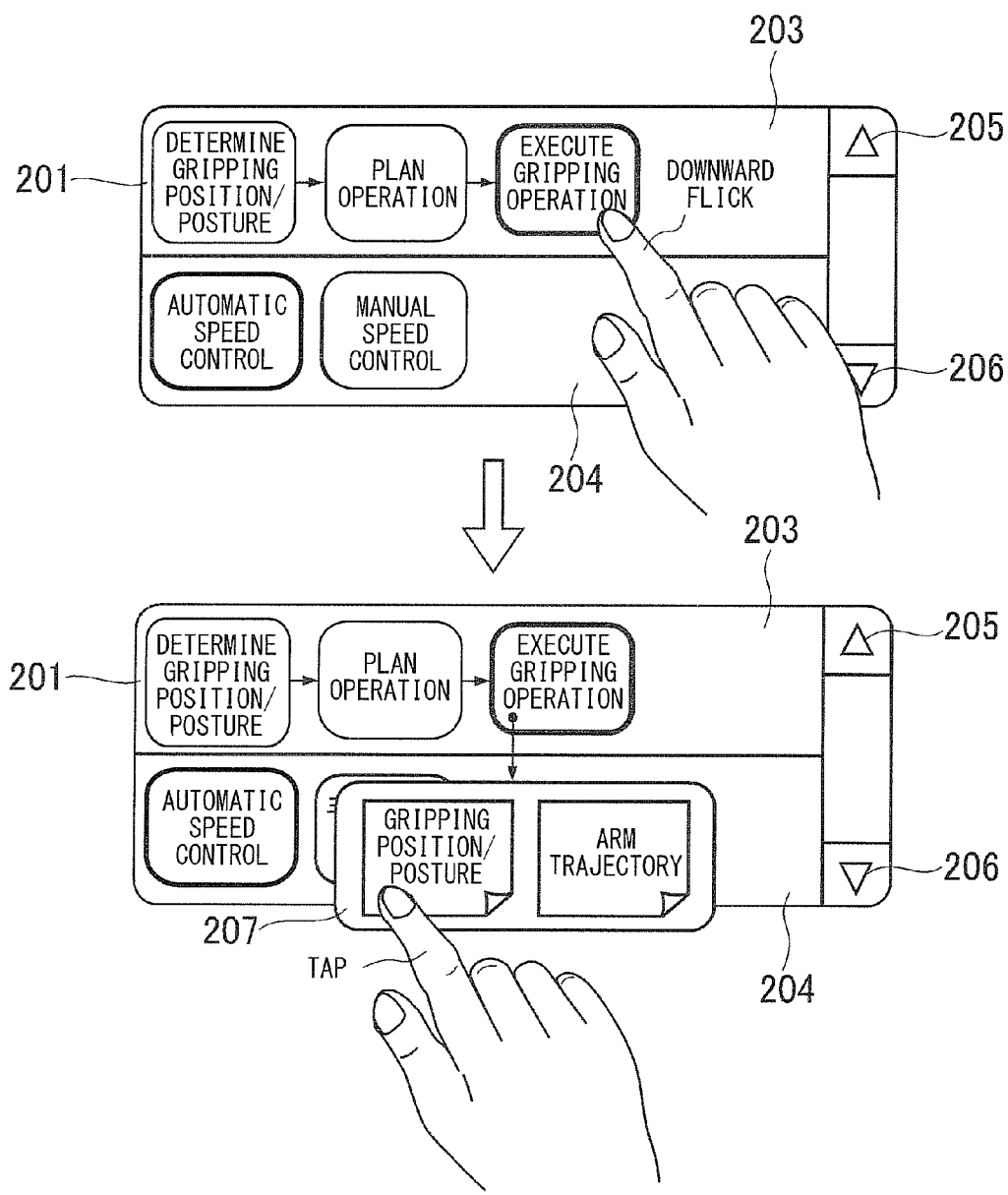
FIG. 14 is a diagram for explaining the task changing method during the task continuation disabled time.

Otherwise, when the user performs a flick operation (for example, downward flick operation) on the task "execute a gripping operation" displayed in the upper display area 203 of the display screen 200 of the display unit 12, the display control unit 13 causes a variable 207 ("gripping position/posture", "arm trajectory"), which is associated with the task, to be displayed on the display screen 200 of the display unit 12 (FIG. 14). When the user performs a tap operation on the variable 207 (for example, "gripping position/posture") on the display screen 200, the display control unit 13 causes a change menu for changing the variable to be displayed on the display screen 200 of the display unit 12. This enables the user to change the variable for the task.

Figure 15:
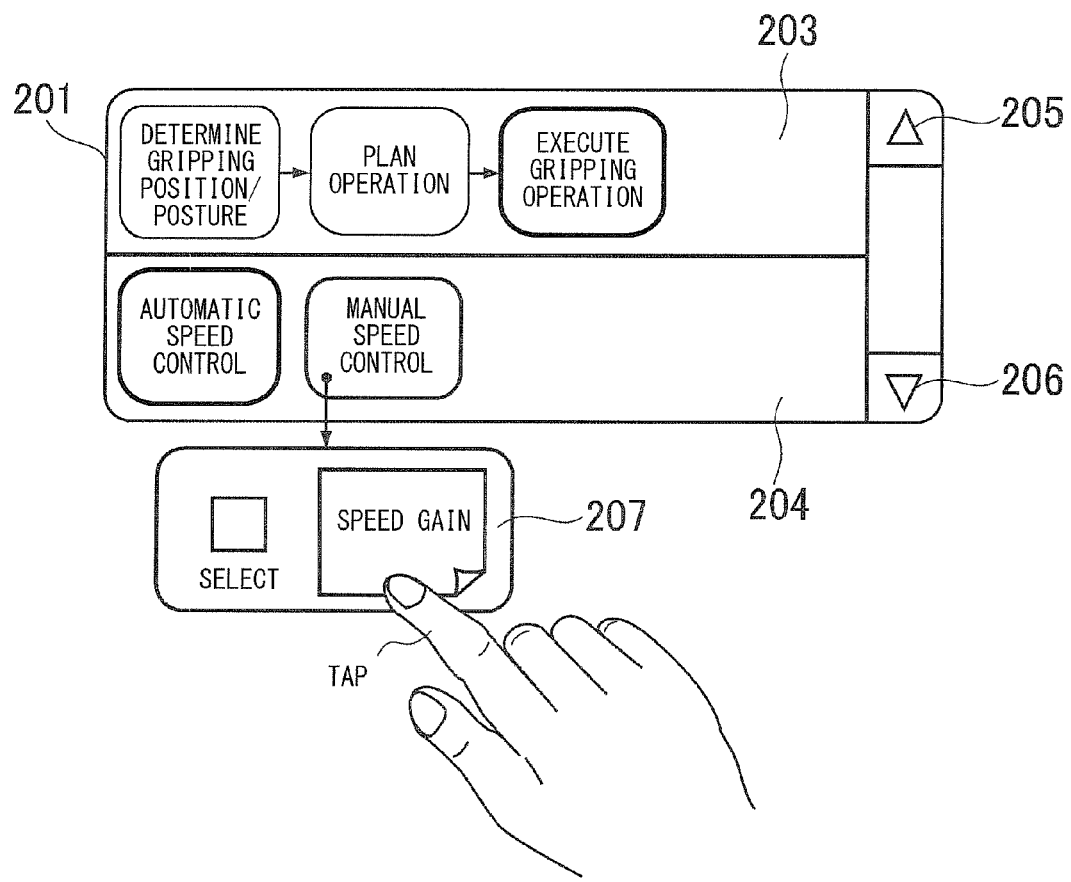
FIG. 15 is a diagram for explaining the task changing method during the task continuation disabled time.

More alternatively, during the task continuation disabled time of the working robot 1, for example, the user selects (by flick operation or the like) the task method "manual speed control" in the lower display area 204 of the display screen 200 of the display unit 12 (FIG. 15). When the task method "manual speed control" is selected, the display control unit 13 causes the variable 207 (such as "speed gain"), which is associated with the task method "manual speed control", to be displayed on the display screen 200. Further, when the user selects the variable "speed gain" (performs a tap operation on the icon "speed gain") on the display screen 200 of the display unit 12, the display control unit 13 causes a change dialog for changing the "speed gain" to be displayed on the display screen 200. Furthermore, when the user selects (by tap operation) the task method, the task is resumed by a different task method. This facilitates changing the task program for the working robot 1 and enables continuation of the task.

During the task continuation disabled time of the working robot 1, for example, when the user selects the upper transition button 205 on the display screen 200 of the display unit 12, the display control unit 13 causes the task ("determine a gripping position/posture", "plan an operation", "execute a gripping operation") of the current hierarchical level, the task ("go get", "look around", "recognize an object", "grip an object") of the hierarchical level higher than that of the task method ("automatic speed control", "manual speed control") for the task being executed, and the task method ("automatic gripping", "manual arm operation") for the task being executed, to be displayed in the upper display area 203 and the lower display area 204 of the display screen 200 of the display unit 12 (FIG. 16). In this case, the user can change the task method to "manual arm manipulation" by selecting the task method (by performing a tap operation on the icon). This facilitates changing the task program for the working robot 1 and enables continuation of the task.

As described above, in this exemplary embodiment, when it is impossible for the working robot 1 to continue the task, the task of the working robot 1 is temporarily stopped so as to bring the disabled task into a continuable state. At this time, according to the selection manipulation by the user, the display control unit 13 causes a select menu for selecting another task method in the hierarchical level currently displayed in the task program, a change menu for changing the variable, or a task, a task method, and a variable in another hierarchical level, to be displayed on the display screen 200 of the display unit 12.

Then, the user selects another task method from the select menu, changes the variable as needed, or changes only the variable while selecting the same task method, and carries out a task instruction (performs a tap operation on the task icon). This makes it possible to easily and appropriately change the task program for the working robot 1 and to resume the task. Note that when the user thinks it is preferable to use another task method of a higher hierarchical level in the task program, the user may permit a transition to a higher hierarchical level to select the task method of the hierarchical level on the display screen 200 of the display unit 12 and resume the task.

With this configuration, information optimum for the status of the working robot 1 at that time can be exclusively selected from the task program including a plurality of tasks and can be presented to the user, thereby allowing the user to intuitively and easily set the task program for the working robot 1 based on the information. Moreover, as the task method, options suitable for each task is prepared in addition to individual manipulation (manual manipulation for each axis). This contributes to a considerable reduction in operating time, as compared with a typical task changing apparatus that causes an operation to be performed only by individual manipulation.

When the user performs the change manipulation as described above and completes the task during the task continuation disabled time of the working robot 1, the display control unit 13 causes a storage menu 208 ("overwrite", "create a copy of a task", "not save") for storing the changed setting information (changed task method and variable) into the storage unit 11, to be displayed on the display screen 200 of the display unit 12, for example (FIG.

17). Further, the display control unit 13 causes the message information 202 indicating that "The task has been completed. Do you save the changed information on the task in progress?" to be displayed on the display screen 200 of the display unit 12. In response to this, when the user selects "overwrite" or "create a copy of a task" on the display 200 of the display unit 12, for example, the task changing unit 14 changes the task program based on the changed setting information described above and stores the changed task program into the storage unit 11.

As described above, during the task continuation disabled time of the working robot 1, an inquiry is sent to the user to "overwrite" the original task program with the set contents, which are obtained after the user selects a task method and changes the setting of a variable, or to record a copy of the task program (build up experience). This promotes the user to record the changed set contents. This allows the user to record the changed set contents by himself/herself. Consequently, the user can use the record of the changed set contents, and a troublesome situation in which a similar task continuation disability occurs and similar settings should be made again can be avoided in the case of executing the same task next time under the same conditions.

Figure 18:
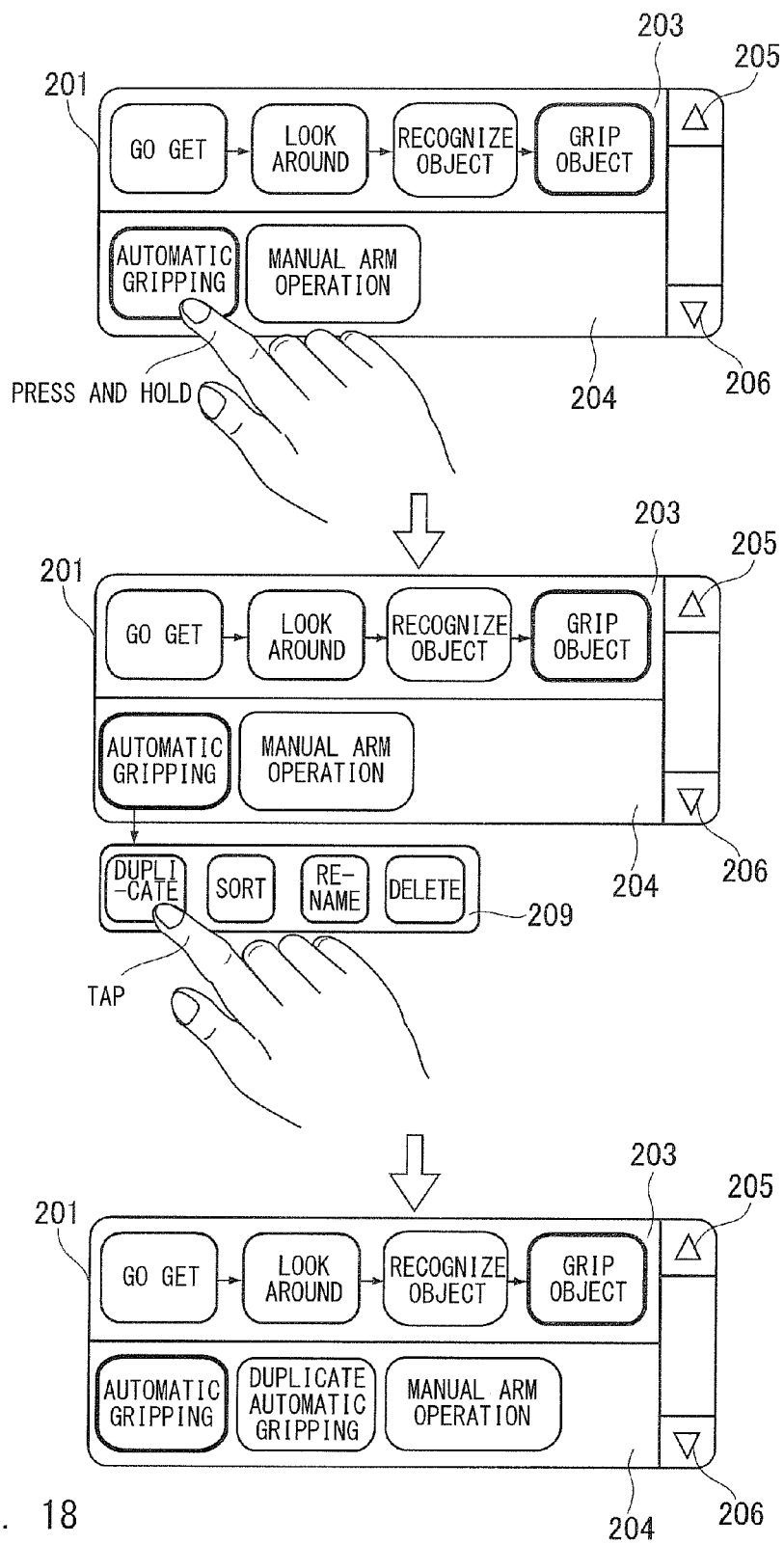
FIG. 18 is a diagram showing a method for duplication, sorting, renaming, and deletion of a task method and a task variable.

Furthermore, when the user presses and holds the button "automatic gripping" in the lower display area 204 of the display screen 200 of the display unit 12, for example, the display control unit 13 causes an edit menu 209 ("duplicate", "sort", "rename", "delete") to be displayed on the display screen 200 of the display unit 12 (FIG. 18). When the user selects (by tap operation) "duplicate", for example, from the edit menu 209 on the display screen 12, the display control unit 13 adds "duplicate automatic gripping" to be displayed in the lower display area 204 of the display screen 200 of the display unit 12. This configuration facilitates duplicating, sorting, renaming, and deleting the task methods.

For example, the edit menu 209 corresponding to the icon for the task method is displayed. Then, a duplication button is selected from the edit menu 209 to create an icon for duplicating the task method. Further, modification to the task program by the manipulation of changing the task variable as described above is performed on the icon for the duplicated task method. Then, when the user performs an execution instruction on the icon for the duplicated task method, the modified task program is executed. This facilitates creation and execution of a similar task program. Accordingly, a similar task program in which the settings are partially changed can be prepared in advance and the user can select the program depending on the situation, thereby avoiding a situation in which a similar task continuation disability occurs and the user should perform the instruction all over again.

Figure 19:
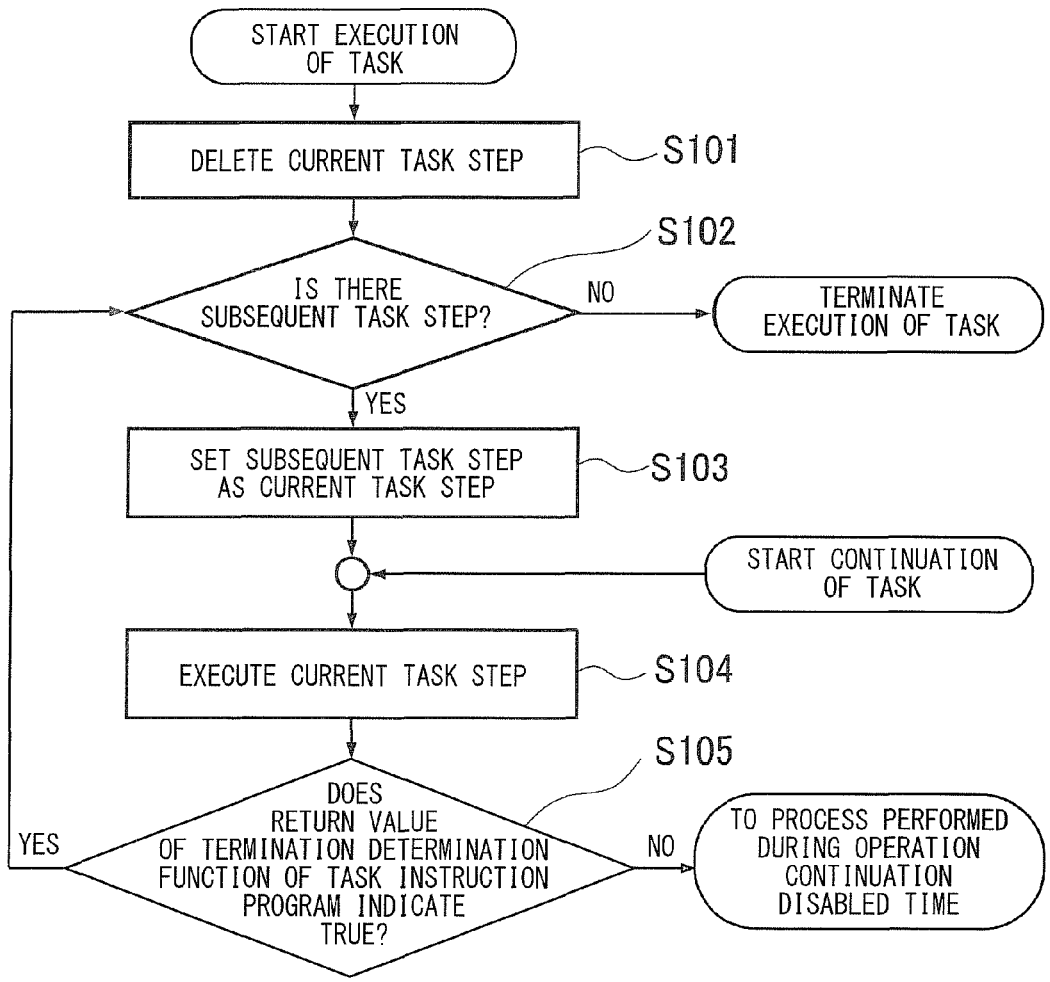
FIG. 19 is a flowchart showing an execution flow of a task program executed by a working robot according to an exemplary embodiment of the present invention.

Now, an execution flow of a task program executed by the working robot according to this exemplary embodiment will be described. FIG. 19 is a flowchart showing the execution flow of the task program executed by the working robot according to this exemplary embodiment.

The working robot 1 deletes the currently-set task step (stop S101), and determines whether there is a subsequent task step (step S102).

When determining that there is no subsequent task step (NO in step S102), the working robot 1 terminates the execution of the task. On the other hand, when determining that there is a subsequent task step (YES in step S102), the working robot 1 sets the subsequent task step as the current task step (step S103).

The working robot 1 executes the current task step thus set (step S104).

The working robot 1 determines whether a return value of a termination determination function in the current task program indicates TRUE (termination determination) (step S105). When determining that the return value of the termination determination function indicates TRUE (YES in step S105), the working robot 1 returns to the process (step S102) described above. On the other hand, when determining that the return value of the termination determination function does not indicate TRUE (NO in step S105), the working robot 1 shifts to a process to be carried out during the task continuation disabled time as described later.

Figure 20:
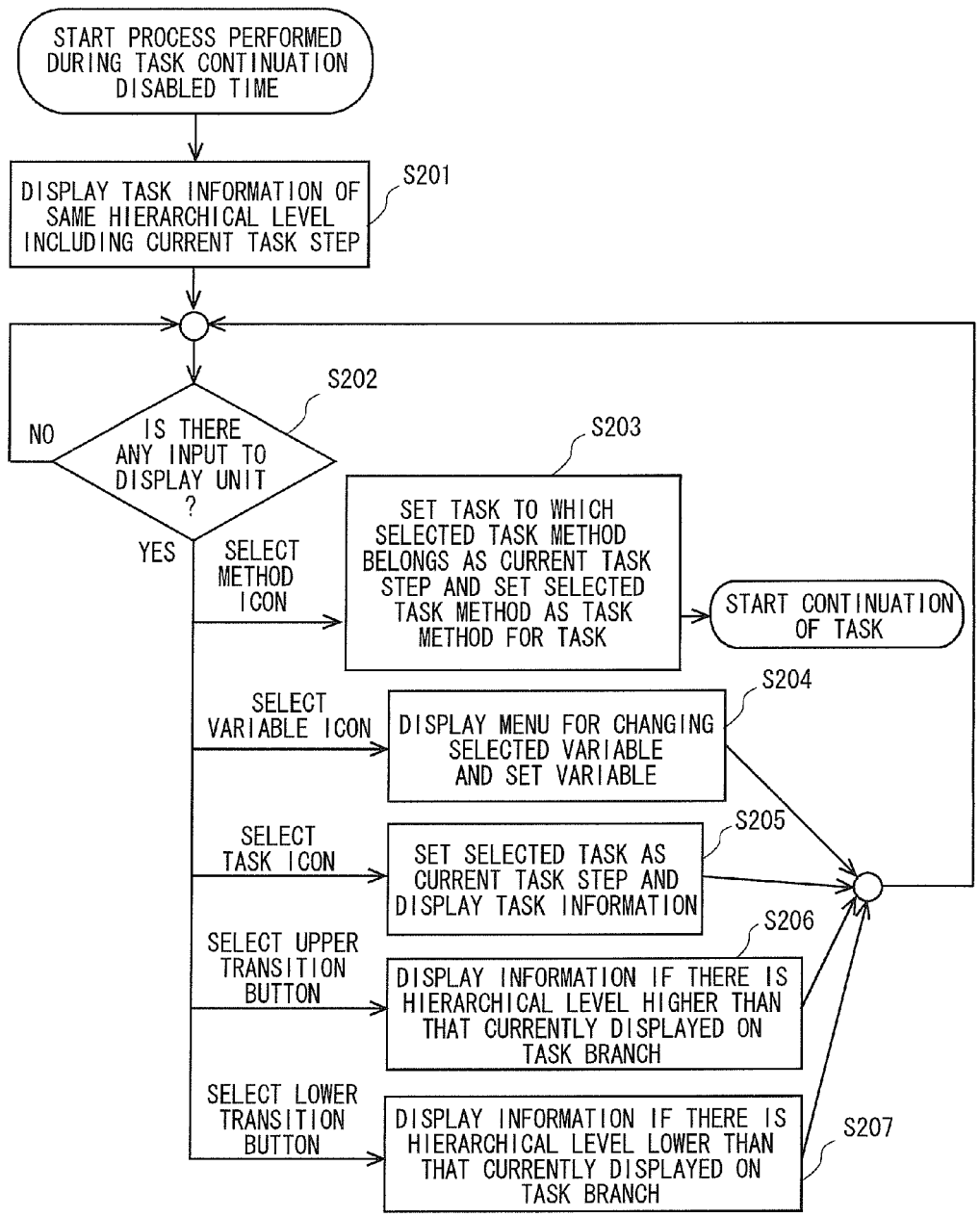
FIG. 20 is a flowchart showing a processing flow during the task continuation disabled time of the working robot.

Next, a processing flow to be executed during the task continuation disabled time of the working robot 1 will be described in detail. FIG. 20 is a flowchart showing the processing flow to be executed during the task continuation disabled time of the working robot.

When the working robot 1 is in the task continuation disabled state, the display unit 12 causes the task information of the same hierarchical level including the current task step to be displayed on the display screen 200 (step S201).

When a task method (method icon) is selected on the display screen 200 of the display unit 12 (YES in step S202), the task changing unit 14 sets the task belonging to the selected task method as the current task step, and sets the selected task method as the task method for the task step (step S203). After that, the process returns to the process for executing the current task step (step S 104).

When a variable (variable icon) is selected on the display screen 200 of the display unit 12 (YES instep S202), the display control unit 13 causes the change menu for changing the task variable to be displayed on the display screen 200 of the display unit 12. The task changing unit 14 sets the variable for the task in accordance with the change in the change menu on the display screen 200 of the display unit 12 (step S204).

When a task (task icon) is selected on the display screen 200 of the display unit 12 (step S202), the task changing unit 14 sets the selected task as the current task step and causes the task information to be displayed (step S205).

When the upper transition button 205 is selected on the display screen 200 of the display unit 12 (step S202), and when there is a hierarchical level higher than the hierarchical level currently displayed on the task branch, the display control unit 13 causes the task, the task method, or the variable of the higher hierarchical level to be displayed in the upper display area 203 and the lower display area 204 of the display screen 200 of the display unit 12 (step S206).

When the lower transition button 206 is selected on the display screen 200 of the display unit 12 (step S202), and when there is a hierarchical level lower than the hierarchical level currently displayed on the task branch, the display control unit 13 causes the task, the task method, or the variable of the lower hierarchical level to be displayed in the upper display area 203 and the lower display area 204 of the display screen 200 of the display unit 12 (step S207).

As described above, the task changing apparatus 10 according to this exemplary embodiment stores a task program including a plurality of hierarchical levels representing task information including a plurality of tasks and task methods to be executed by the working robot 1, and variables associated with the tasks and task methods. The tasks, task methods, and task variables are associated with each other for each hierarchical level of the stored task program, and are displayed on the display screen 200 of the display unit 12 so as to allow selection of the tasks, task methods, and task variables. The task program for the working robot 1 is changed based on a series of pieces of task information selected on the display screen 200 of the display unit 12. This allows the user to easily change and set the task program for the working robot 1 by intuitively selecting the task information displayed on the display screen 200 of the display unit 12, even when it is impossible for the working robot 1 to continue the task, for example. In other words, the contents of tasks to be executed by the robot can be easily changed.

Note that the present invention is not limited to the above-described exemplary embodiments, but can be modified as appropriate without departing from the gist of the invention.

The present invention can implement the processes shown in FIGS. 19 and 20, for example, by causing a CPU to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such changes as would be obvious to one skilled in the art are intended for inclusion within the scope of the following claims.

What is claimed is:

1. A task changing apparatus that changes a task program executed by a robot, comprising:
a storage unit that stores a task program including a plurality of hierarchical levels arranged in a tree-like structure representing a plurality of pieces of task information executed by the robot and lower-order task information associated with the task information;
a display control unit that causes the task information to be displayed on a display screen of a display unit so as to allow setting of the task information, the task information being associated with each other for each hierarchical level of the task program stored in the storage unit; and
a change unit that changes the task program for the robot based on a series of pieces of task information set on the display screen of the display unit, wherein:
the task program stored in the storage unit configures the task information in the plurality of hierarchical levels, the task information including a plurality of task methods associated with each other in each hierarchical level indicating a task content of the robot, a higher-order task in the task program being recursively deployed and defined into a plurality of lower-order tasks,
upon determining that the robot performs a preset task and is in an unworkable state during the process of an operation thereof, the display control unit causes message information for notifying the unworkable state to be displayed on the display screen of the display unit, and causes the task information to be displayed on the display screen of the display unit so as to allow setting of the task information, the task information being associated with each other for each hierarchical level of the task program, and
the display control unit performs at least one of:
(A) on the display screen of the display unit, displaying the plurality of task methods side by side in a selectable manner in order to change the task method to a different task method, and
(B) on the display screen of the display unit displaying the plurality of task methods, displaying, when one of the displayed task methods is selected, a variable list for changing a variable associated with the selected task method, and displaying, when one of the variables in the variable list is selected, a change menu for changing the selected variable.

2. The task changing apparatus according to claim 1, wherein the display control unit causes the task information and the task method included in the task information to be displayed side by side on the display screen of the display unit so as to allow selection of the task information and the task method.

3. The task changing apparatus according to claim 1, wherein
the display unit displays, on the display screen, the task information and upper and lower transition buttons that cause a display to transit upward and downward, respectively, and
when the upper transition button is selected, the display control unit causes task information of a higher hierarchical level in the task program than the task information displayed on the display screen of the display unit, to be displayed on the display screen of the display unit, and when the lower transition button is selected, the display control unit causes task information of a lower hierarchical level in the task program than the task information displayed on the display screen of the display unit, to be displayed on the display screen of the display unit.

4. The task changing apparatus according to claim 1, wherein when a predetermined manipulation is performed on a task method displayed on the display screen of the display unit, the display control unit causes a change menu to be displayed on the display screen of the display unit, the change menu being set to change a variable for the task information.

5. The task changing apparatus according to claim 4, wherein the display control unit causes a storage menu to be displayed on the display screen of the display unit, the storage menu being set to select whether or not the task method and/or the variable changed on the display screen of the display unit is stored into the storage unit.

6. The task changing apparatus according to claim 1, wherein when a predetermined manipulation is performed on the task information displayed on the display screen of the display unit, the display control unit causes an edit menu to be displayed on the display screen of the display unit, the edit menu being set to edit an icon associated with the task information.

7. The task changing apparatus according to claim 6, wherein the edit menu includes at least one of duplication, sorting, renaming, and deletion of the icon associated with the task information.

8. A task changing method for changing a task program executed by a robot, the task changing method comprising:
storing a task program including a plurality of hierarchical levels arranged in a tree-like structure representing a plurality of pieces of task information executed by the robot and lower-order task information associated with the task information;
causing the task information to be displayed on a display screen so as to allow setting of the task information, the task information being associated with each other for each hierarchical level of the task program;
changing the task program for the robot based on a series of pieces of task information set on the display screen;
configuring the task information in the plurality of hierarchical levels, the task information including a plurality of task methods associated with each other in each hierarchical level indicating a task content of the robot, a higher-order task in the task program being recursively deployed and defined into a plurality of lower-order tasks;
upon determining that the robot performs a preset task and is in an unworkable state during the process of an operation thereof, causing message information for notifying the unworkable state to be displayed on the display screen, and causing the task information to be displayed on the display screen so as to allow setting of the task information, the task information being associated with each other for each hierarchical level of the task program, and
performing at least one of:
(A) on the display screen, displaying the plurality of task methods side by side in a selectable manner in order to change the task method to a different task method, and
(B) on the display screen displaying the plurality of task methods, displaying, when one of the displayed task methods is selected, a variable list for changing a variable associated with the selected task method, and displaying, when one of the variables in the variable list is selected, a change menu for changing the selected variable.

9. A non-transitory computer readable medium storing a task changing program for causing a computer to execute processing including:
causing task information to be displayed on a display screen so as to allow setting of the task information, the task information being associated with each other for each hierarchical level of a task program, the task program including a plurality of hierarchical levels arranged in a tree-like structure representing a plurality of pieces of task information executed by a robot and lower-order task information associated with the task information;
changing the task program for the robot based on a series of pieces of task information set on the display screen;
configuring the task information in the plurality of hierarchical levels, the task information including a plurality of task methods associated with each other in each hierarchical level indicating a task content of the robot, a higher-order task in the task program being recursively deployed and defined into a plurality of lower-order tasks;
upon determining that the robot performs a preset task and is in an unworkable state during the process of an operation thereof, causing message information for notifying the unworkable state to be displayed on the display screen, and causing the task information to be displayed on the display screen so as to allow setting of the task information, the task information being associated with each other for each hierarchical level of the task program, and
performing at least one of:
(A) on the display screen, displaying the plurality of task methods side by side in a selectable manner in order to change the task method to a different task method, and
(B) on the display screen displaying the plurality of task methods, displaying, when one of the displayed task methods is selected, a variable list for changing a variable associated with the selected task method, and displaying, when one of the variables in the variable list is selected, a change menu for changing the selected variable.

* * * * *